Dec. 8, 1936.  C. EISLER  2,063,236
MACHINE FOR CUTTING BARS AND TUBES OF GLASS
Filed Feb. 20, 1936  2 Sheets-Sheet 1
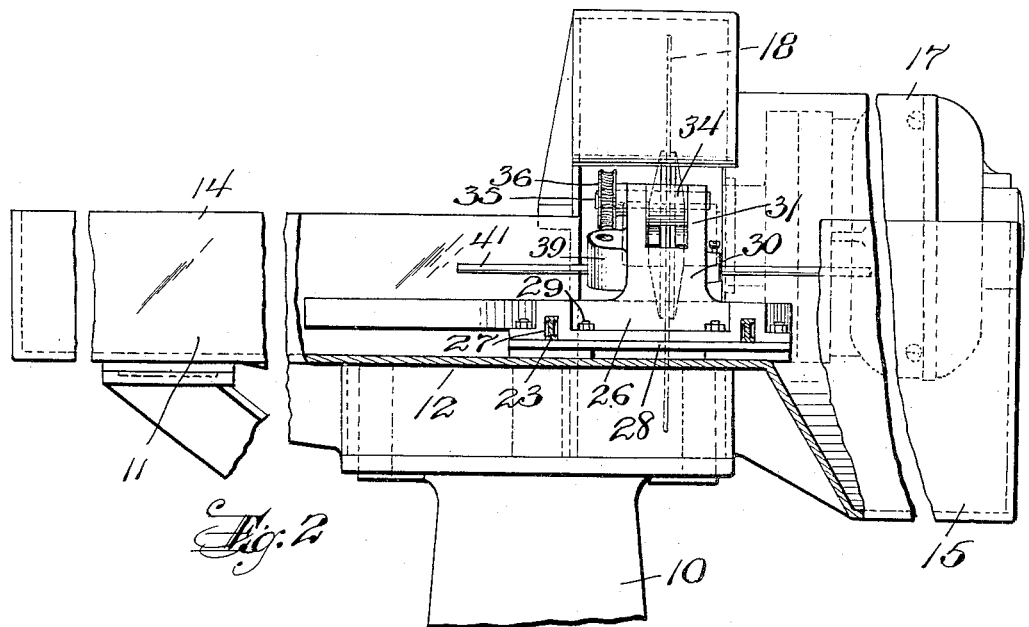
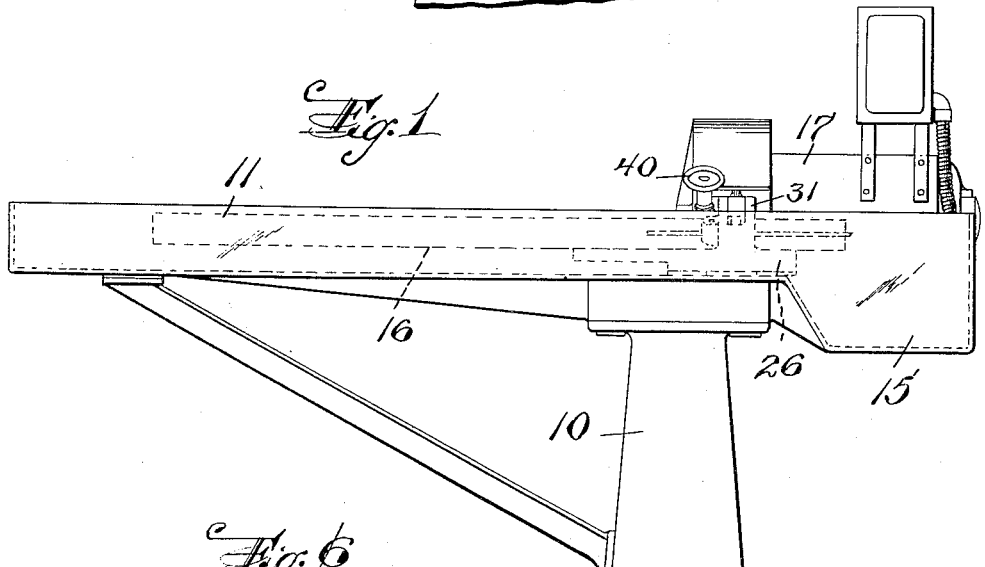
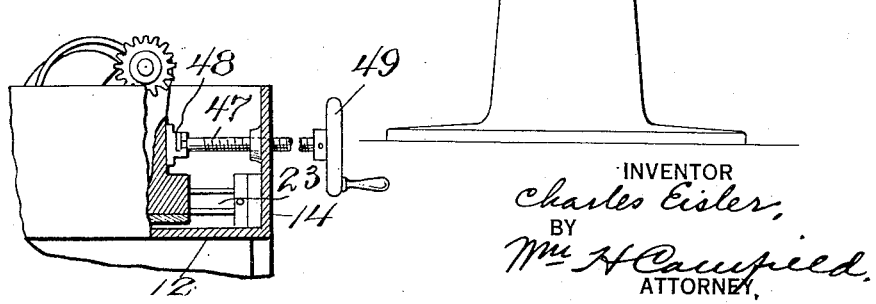
INVENTOR
Charles Eisler,
BY
Wm H Caufield
ATTORNEY.

Dec. 8, 1936.  C. EISLER  2,063,236
MACHINE FOR CUTTING BARS AND TUBES OF GLASS
Filed Feb. 20, 1936  2 Sheets-Sheet 2
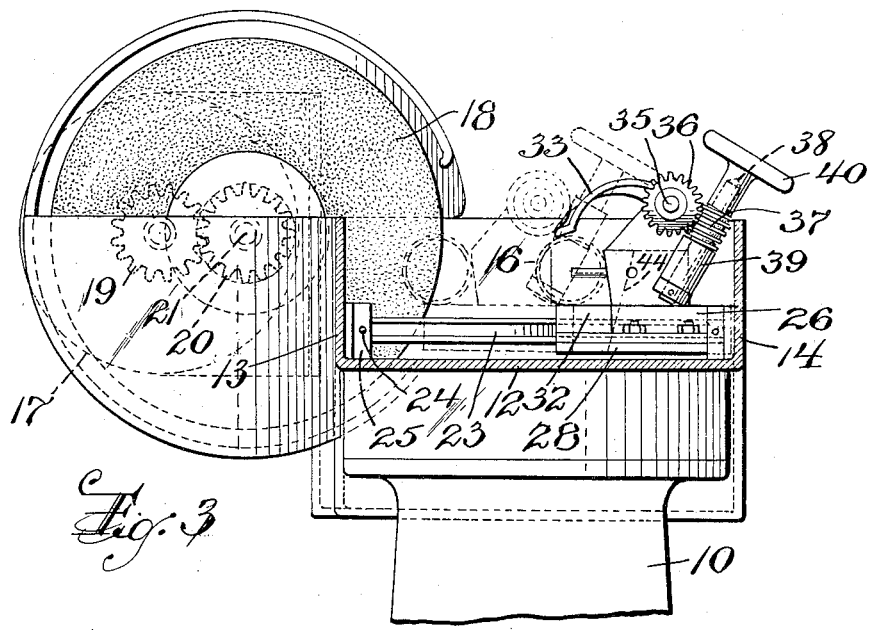
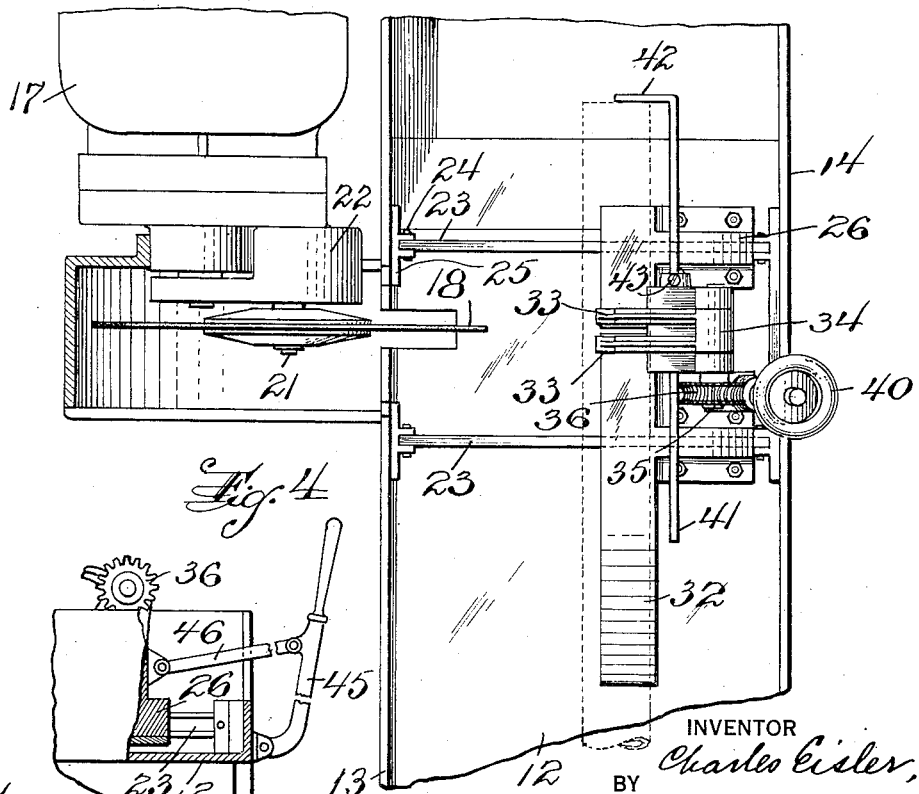
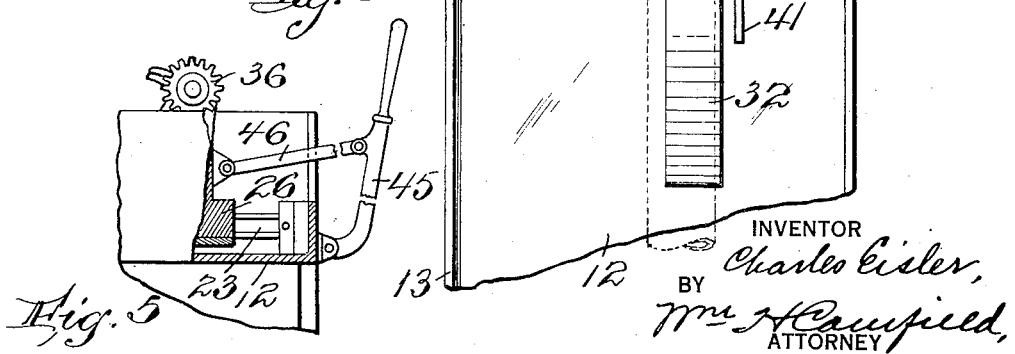

Patented Dec. 8, 1936

2,063,236

UNITED STATES PATENT OFFICE 2,063,236

MACHINE FOR CUTTING BARS AND TUBES OF GLASS

Charles Eisler, South Orange, N. J.

Application February 20, 1936, Serial No. 64,989

2 Claims. (Cl. 51—98)

This invention relates to an improved machine for cutting lengths from bars and tubes, particularly glass bars or tubes. The machine is adapted for use on bars of various diameters within reasonable limits and is adapted for the quick and easy installation and removal of bars and cut lengths.

The machine is constructed to firmly grasp a glass tube with sufficient pressure to insure the firm position of the tube but with no danger of breakage by excess pressure on the glass tube.

The invention is illustrated in the accompanying drawings. Figure 1 is a side view of my improved machine for cutting glass bars or tubes transversely into lengths. Figure 2 is an enlarged section of Figure 1 with part of the carriage removed. Figure 3 is a cross-section on Figure 2. Figure 4 is a top view of Figure 3. Figures 5 and 6 are detail views of alternative means for propelling the carriage that holds the bar to be cut.

The machine is usually supported on a base 10 and includes a trough-like frame 11 having the bottom 12 and side walls 13 and 14. The frame is of a length to receive bars and tubes of commercial sizes and includes a well 15 at one end into which the cut lengths drop after they are severed from the bar. A bar or tube is shown in dotted outline at 16.

Opposite the well 15 is an electric motor 17 which drives the cutting disc 18. The motor and disc are geared together by the gears 19 and 20 which off-set of the disc allows it to project through the wall 13 into the trough-like frame to fully sever a length from the glass tube 16. The disc 18 and the gear 20 are mounted on a shaft 21 supported in the bearing 22, which also acts as a housing for the gears 19 and 20.

A pair of tracks 23 are secured in spaced relation to the walls 13 and 14 usually by pins 24 in the brackets 25. The tracks are spaced from the bottom 12 and support a carriage 26 which has grooves 27 for receiving the tracks 23 and includes a bottom plate 28 secured by screws or bolts 29. The carriage has an upright part 30 which includes bearings 31 at the top. The upright part is in rear of a step 32 and together they act to support and buttress the tube 16.

In order to firmly hold tubes or bars of various diameters I provide a pair of fingers 33 spaced apart far enough to allow the passage of the cutting disc 18 between them. The fingers 33 extend from a sleeve 34 on a shaft 35 in the bearings 31. The shaft 35 is provided with a worm gear 36 which is in mesh with a worm 37. The worm 37 is secured on a shaft 38 rotatably supported in a bearing 39 on the upright part 30 of the carriage. The shaft 38 is provided with a hand wheel 40 which is preferably mounted, with a working fit, on the shaft 28 but in case of carelessness or in the case of a thin tube 16, the hand wheel will slip thus preventing breakage of the tube 16.

A guide rod 41 is slidable in the carriage and has a bent end 42 for engagement by the end of the tube 16 and is held in place by a screw 43. This is a convenience in cutting many canes of the same length. The carriage has a slit 44 cut in it to receive the disc 18 thus allowing the disc to entirely sever the glass tube.

The operation is simple. A glass tube is placed on the step 32 and against the upright part 30 of the carriage. The hand wheel 40 is then turned to force the spaced fingers down on the tube 16. The fingers are so proportioned that they engage the tube beyond its centre and in this way the tube is supported at three substantially equally spaced points in its periphery.

The carriage is then passed along the tracks and the tube is cut off by the disc 18. The fingers 33 are raised, the cut length descends into the well 15, the tube 16 is pushed up against the stop 42 and the operation is repeated.

The carriage may be advanced by hand or mechanical means. One such means is shown in Figure 5 in which the hand lever 45 is pivoted to the frame and a link 46 connects the hand lever and the carriage.

Another form is shown in Figure 6 in which a screw 47 is mounted in a screw threaded hole in the frame and is secured to the carriage at 48 and has a hand wheel 49. This form is well adapted for use in machines for cutting bars or heavy tubes and in which a steady slow advance of the bar is desirable.

I claim:—

1. A machine for cutting bars and tubes of glass and the like, comprising a trough-like frame, a cutting disc projecting through one wall of the trough, a pair of tracks supported on the sides of the trough and spaced from the bottom thereof, a carriage supported on the tracks and comprising an upright part and a projecting step for supporting a bar, the upright part having a slot in line with the disc, a pair of spaced fingers pivoted to the top of the upright part and adapted to engage a bar on the step beyond the centre of the bar, a shaft to which the fingers are secured, said upright part having bearings in which the shaft is supported, and means for rotatably adjusting the shaft.

2. A machine for cutting bars and tubes of glass and the like, comprising a trough-like frame, a cutting disc projecting through one wall of the trough, a pair of tracks supported on the sides of the trough and spaced from the bottom thereof, a carriage supported on the tracks and comprising an upright part and a projecting step for supporting a bar, the upright part having a slot in line with the disc, a pair of spaced fingers pivoted to the top of the upright part and adapted to engage a bar on the step beyond the centre of the bar, a shaft to which the fingers are secured, said upright part having bearings in which the shaft is supported, a gear on the shaft, a sleeve on the carriage, a shaft in the sleeve, a worm on the shaft in the sleeve, and a handwheel on the latter shaft for adjusting the position of the fingers.

CHARLES EISLER.